(12) United States Patent
Wiltjer

(10) Patent No.: US 6,357,930 B1
(45) Date of Patent: Mar. 19, 2002

(54) REVERSIBLE CONNECTOR SLEEVE WITH A BREAKWAY TAB

(75) Inventor: Jerry A. Wiltjer, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/545,713

(22) Filed: Apr. 7, 2000

(51) Int. Cl.[7] .............................................. G02B 6/38
(52) U.S. Cl. ............................ 385/60; 385/53; 385/55; 385/59
(58) Field of Search ..................... 385/53–60, 62–72, 385/75–78, 81–87

(56) References Cited

U.S. PATENT DOCUMENTS

| | | | |
|---|---|---|---|
| 4,376,565 A | 3/1983 | Bird et al. | 339/186 M |
| 4,717,360 A | 1/1988 | Czaja | 439/710 |
| 4,773,881 A | 9/1988 | Adams, III | 439/681 |
| 5,000,701 A | 3/1991 | Norden | 439/680 |
| 5,121,454 A | 6/1992 | Iwano et al. | 385/60 |
| 5,274,729 A | 12/1993 | King et al. | 385/134 |
| 5,346,412 A | 9/1994 | Fedder et al. | 439/681 |
| 5,828,804 A | * 10/1998 | Akins et al. | 385/58 |
| 5,923,805 A | * 7/1999 | Anderson et al. | 385/86 |

* cited by examiner

Primary Examiner—Rodney Bovernick
Assistant Examiner—Juliana K. Kang
(74) Attorney, Agent, or Firm—Robert A. McCann

(57) ABSTRACT

A coupler for selectively coupling a pair of duplex fiber optic cables in either a matched or reversed configuration is disclosed. The coupler includes a housing, adapted to receive and interlock with the cables, and a detachable wall structure, extending from the housing. The wall structure facilitates insertion of the second cable in the matched configuration. With the wall structure removed, the second cable is insertable into the housing in the reversed configuration.

9 Claims, 3 Drawing Sheets

REVERSIBLE CONNECTOR SLEEVE WITH A BREAKWAY TAB

BACKGROUND OF THE INVENTION

The present invention relates generally to a connector sleeve, or coupler, for interconnecting, or coupling, two duplex fiber optic cables. More particularly, the invention relates to a duplex coupler that facilitates coupling in a matched configuration, i.e., receiving and transmitting optical fibers coupled together, respectively, while allowing interconnection in a reversed configuration when desired.

Numerous couplers for duplex fiber optic cables are available. Typically the coupler is keyed such that the respective receiving and transmitting optical fibers are aligned or matched. One such coupler is shown in European Patent Application EP 0 973 052 A2, and the teachings thereof are incorporated herein by reference.

Certain couplers allow one of the duplex cables to be inserted and locked in a mismatched, or reversed configuration. This reversability allows an interconnection error to be corrected at the particular coupler, without the time-consuming, labor intensive effort of locating the error or re-terminating the fiber optic cable.

In one such coupler, insertion of the fiber optic cable in a reversed orientation is prohibited by a removable guard, internal to the coupler, i.e., within the aperture adapted to receive the fiber optic cable. To lock the fiber optic cable in the reversed orientation, the guard is removed and re-attached within the aperture to prohibit insertion in the matched orientation. Such manipulation is itself difficult and time-consuming.

SUMMARY OF THE INVENTION

In a principal aspect, the present invention is a coupler for selectively coupling a pair of duplex fiber optic cables in either a matched or reversed configuration. The invention includes a housing, adapted to receive and interlock with the cables, and a detachable wall structure, extending from the housing.

The housing has front and back ends. The first cable is inserted in the front end in a predetermined transmitting/receiving orientation. The first cable interlocks with the housing at a predetermined front-end insertion depth.

The second cable is insertable into the back end of the housing in a matched or reversed orientation with respect to the predetermined transmitting/receiving orientation. At a predetermined back-end insertion depth, the second cable interlocks with the housing. The first and second cables are in a matched configuration whenever said second cable is interlocked in the matched orientation and in a reversed configuration whenever said second cable is interlocked in the reversed orientation.

The wall structure extends from the back end of the housing. The wall structure engages the second cable prior to interlocking, i.e., prior to achievement of the predetermined back-end insertion depth, whenever the second cable is inserted in the reversed orientation. The wall structure is readily detachable to allow interlocking of the second cable to the housing in the reversed orientation, thereby providing a reversed configuration.

It is thus an object of the preset invention to provide an improved connector sleeve or coupler for duplex fiber optic cables. Another object is an improved, readily manufactured and inexpensive sleeve.

Still another object is a duplex coupler that facilitates interconnection in a matched configuration. It is a further object of the present invention to provide a coupler for duplex fiber optic cable that allows, when desired, interconnection in a reversed configuration such that an interconnection error can be "cured" at the coupler in an easy and quick manner.

These and other features, objects and advantages of the present invention are set forth or apparent in the following detailed description.

BRIEF DESCRIPTION OF THE DRAWING

A preferred embodiment of the present invention is described herein with reference to the drawing herein.

DETAILED DESCRIPTION OF A PREFERRED EMBODIMENT

Figure 1:
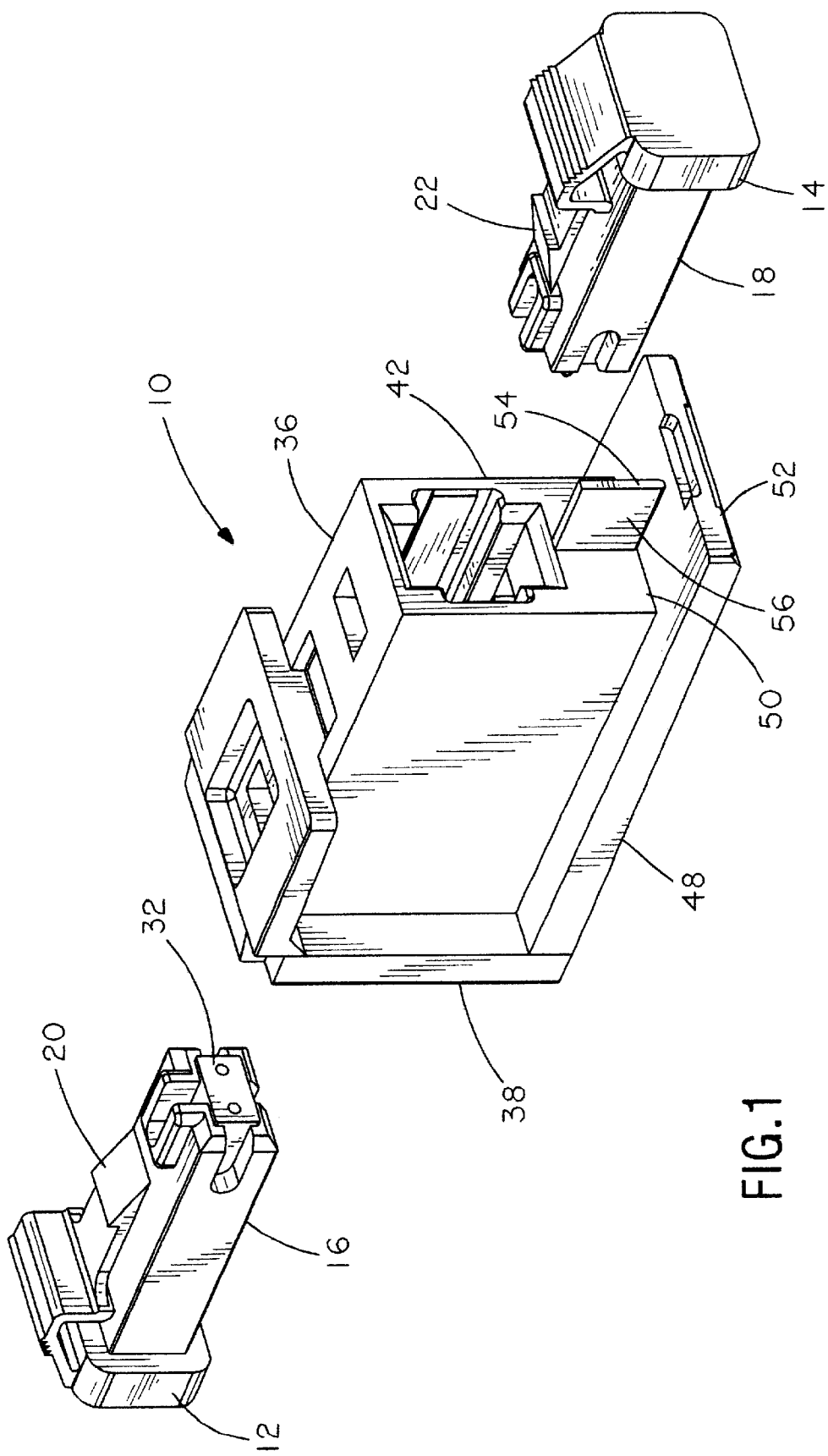
FIG. 1 is an exploded perspective view of the preferred embodiment, illustrating the connector sleeve and pair of duplex fiber optic cables for interconnection therein.

The present invention is shown in FIGS. 1–8 as a duplex connector sleeve or coupler, generally designated 10. The sleeve 10 interconnects, or couples, a first duplex fiber optic cable 12 to a second duplex fiber optic cable 14. As is well shown in the art, the first and second fiber optic cables 12, 14 are terminated with first and second duplex connectors 16, 18, respectively, adapted to be received by the sleeve 10. Upon insertion to a predetermined depth within the sleeve 10, the connectors 16, 18 snap-locked thereto. More particularly, the first and second connectors 16, 18 include first and second conventional latches 20, 22, respectively, to engage corresponding interlocking apertures in the sleeve 10.

As is well known in the art, the duplex cables 12, 14 include transmitting optical fibers 24, 26 and receiving optical fibers 28, 30, in a side-by-side arrangement. The fibers 24, 28 of the first cable 12 are terminated with a conventional female duplex ferrule assembly 32, and the fibers 26, 30 of the second cable 14 are terminated with a conventional male duplex ferrule assembly 34. The transmitting fibers 24, 26 and receiving fibers 28, 30 are aligned, biased together and coupled within the sleeve 10 in a matched configuration.

The sleeve 10 includes a generally rectangular housing 36. The housing 36 has a front end 38 to receive the first connector 16 in a predetermined transmitting/receiving orientation. That is, the front end 38 is keyed to receive the first connector 16 in only one orientation, such that the transmitting optical fiber 24 is either in a left or right position (as viewed in FIG. 1). In this preferred embodiment, the front end 38 defines a substantially T-shaped front aperture 40 to provide the appropriate keying.

The housing 36 has a back end 42 to receive the second connector 18. The back end 42 defines a substantially planar back wall surface 44 and a substantially cross-shaped back aperture 46, such that the second connector 18 is partially insertable in one of two orientations. More particularly, the back aperture 46 will receive the second connector 18 with the latch 22 either "up" or "down" (as viewed in FIGS. 1 and 6–8). Whenever the second connector 18 is inserted and locked with the latch 22 in the "up" position, the cables 12, 14 are in the matched configuration. Whenever the second connector 18 is inserted and locked (as described in further detail below) with the latch 22 in the "down" position, the cables 12, 14 have the reversed configuration.

Figure 2:
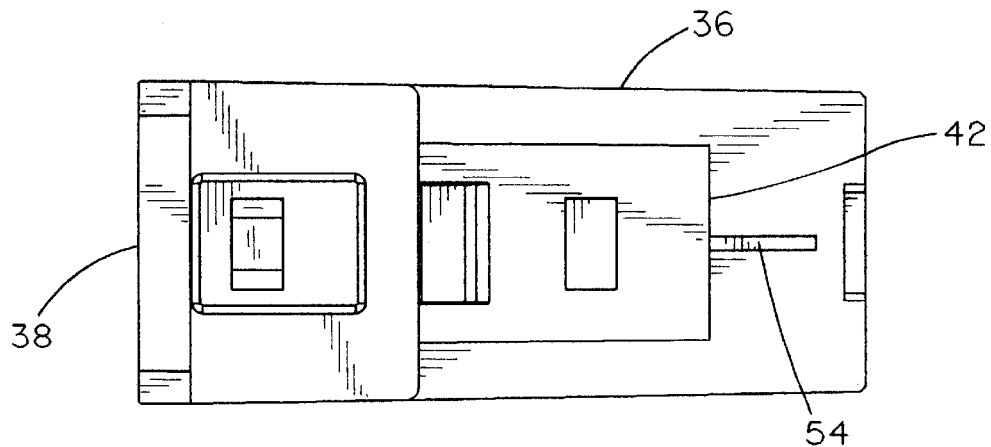
FIG. 2 is a top view of the sleeve shown in FIG. 1.
Figure 3:
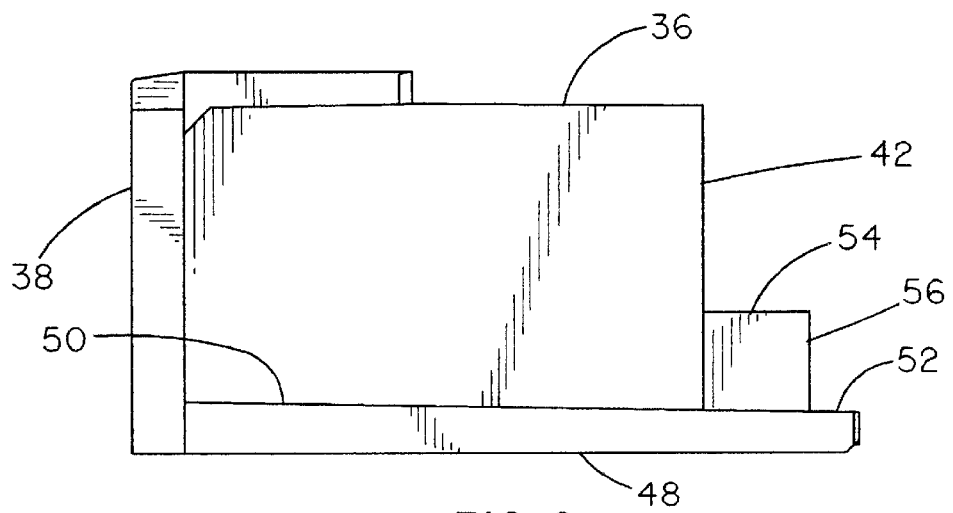
FIG. 3 is a side view of the sleeve shown in FIG. 1.
Figure 4:
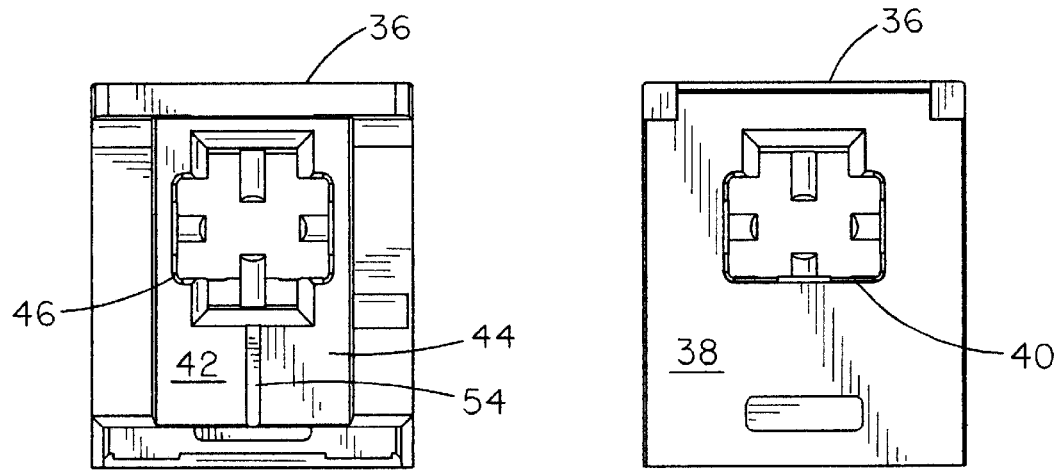
FIG. 4 is a back view of the sleeve shown in FIG. 1.
Figure 5:
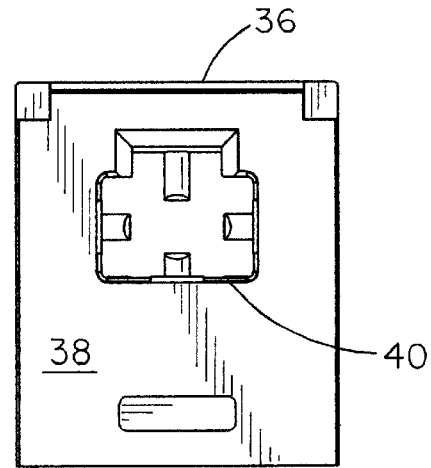
FIG. 5 is a front view of the sleeve shown in FIG. 1.
Figure 6:
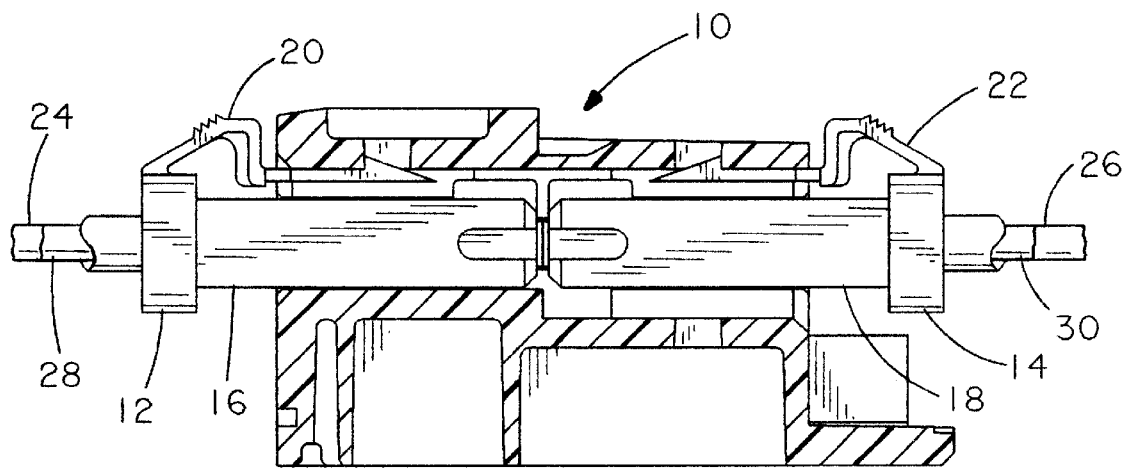
FIG. 6 is a partial cross-sectional view of the embodiment shown in FIG. 1, illustrating interconnection in a matched configuration.

As best shown in FIGS. 1 and 2, the sleeve 10 further includes a base 48, extending from the front end 38 along the bottom 50 of the housing 36. The base 48 extends beyond the back end 42 to provide a support flange 52 below the back aperture 46.

Figure 7:
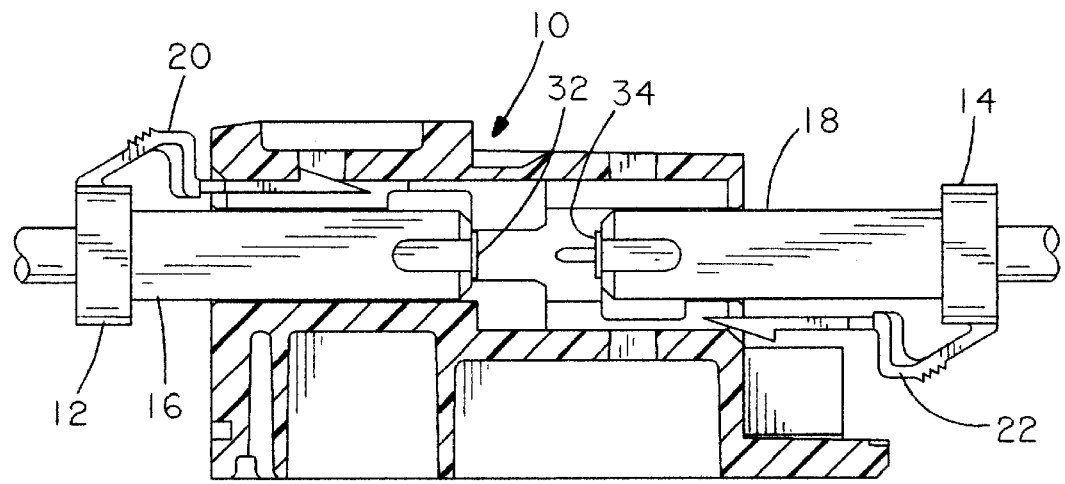
FIG. 7 is a partial cross-sectional view of the embodiment shown in FIG. 1, illustrating a prohibited reversed interconnection.

The sleeve 10 also includes a wall structure 54 extending from the housing 36. As best shown in FIG. 1, the wall structure 54 is a thin, substantially planar wall 56, integral with the housing 36, extending substantially perpendicular from the back wall surface 44 and support flange 52. The wall 56 engages the latch 22 of the second connector 18 prior to achievement of the back-end insertion depth, which is necessary to interlock the sleeve 10 and second connector 18, whenever the second cable 12 is inserted in the reversed orientation (as best shown in FIG. 7).

Figure 8:
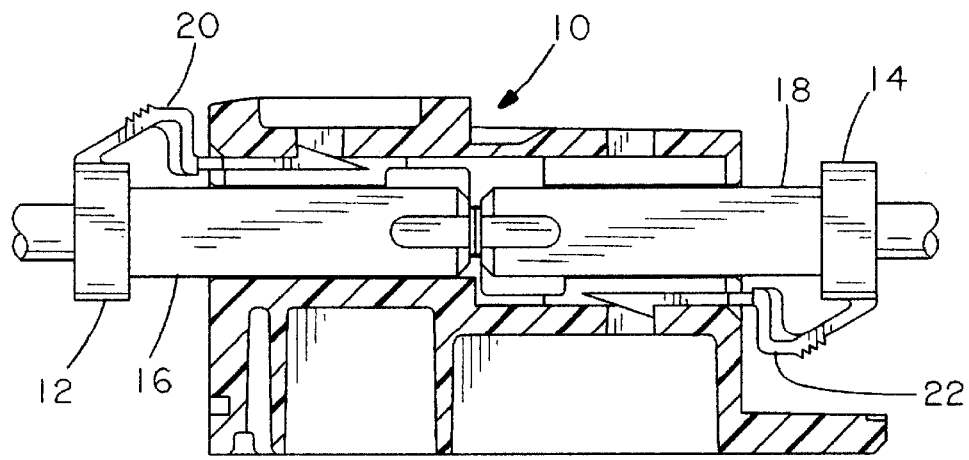
FIG. 8 is a partial cross-sectional view of the embodiment shown in FIG. 1, illustrating interconnection in a reversed configuration.

The wall 56 is scored along the support flange 52 to facilitate detachment thereof. Once removed, interlocking of the second fiber optic cable 12 to the housing 36 in the reversed orientation is permitted (as best shown in FIG. 8).

A preferred embodiment of the present invention has been described herein. It is to be understood that modifications and changes can be made without departing from the true scope and spirit of the present invention, as defined by the following claims which are to be interpreted in view of the foregoing.

I claim:

1. A coupler for coupling first and second duplex fiber optic cables comprising, in combination:

a housing having a front end and a back end;

said first duplex fiber optic cable being insertable into said front end in a predetermined transmitting/receiving orientation, said first duplex fiber optic cable interlocking with said housing at a predetermined front-end insertion depth;

said second duplex fiber optic cable being insertable into said back end in a matched orientation and a reversed orientation, said second duplex fiber optic cable interlocking with said housing at a predetermined back-end insertion depth, said first and second duplex fiber optic cables having a matched configuration whenever said second duplex fiber optic cable is interlocked in said matched orientation and having a reversed configuration whenever said second duplex fiber optic cable is interlocked in said reversed orientation; and a wall structure extending from said housing to engage said second duplex fiber optic cable prior to achievement of said predetermined back-end insertion depth whenever said second duplex fiber optic cable is inserted into said back end in said reversed orientation;

said wall structure being detachable from said housing to allow interlocking of said second fiber optic cable to said housing in said reversed orientation.

2. A coupler as claimed in claim 1 wherein said housing and wall structure are integral.

3. A coupler as claimed in claim 2 wherein said wall structure is a thin substantially planar wall to facilitate separation from said housing.

4. A coupler as claimed in claim 3 wherein said back end of said housing has a substantially planar back surface, said thin substantially planar wall extending substantially perpendicular to said substantially planar back surface.

5. A coupler as claimed in claim 4 wherein said housing has a base extending beyond said back end, said thin substantially planar wall and extending substantially perpendicular thereto.

6. A coupler as claimed in claim 1 wherein said wall structure is scored to facilitate removal thereof from said housing.

7. A coupler as claimed in claim 6 wherein said housing has a base extending beyond said back end, said wall structure extending substantially perpendicular from said base.

8. A coupler as claimed in claim 6 wherein said back end of said housing has a substantially planar back surface, said wall structure extending substantially perpendicular to said substantially planar back surface.

9. A coupler as claimed in claim 8 wherein said housing and wall structure are integral.

\* \* \* \* \*